Figure 3:
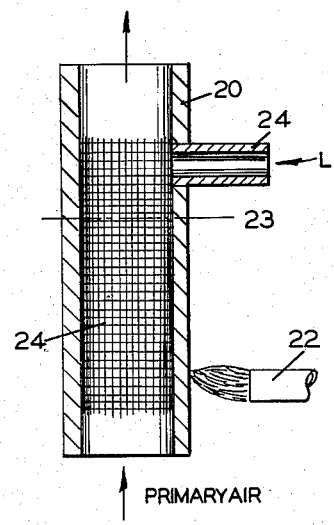

April 15, 1952  H. H. M. MEYER  2,593,166
OIL VAPORIZER
Filed Nov. 25, 1947

INVENTOR
H.H. METTIVIER MEYER

BY Fred M. Vogel
AGENT

Patented Apr. 15, 1952

2,593,166

UNITED STATES PATENT OFFICE 2,593,166

OIL VAPORIZER

Hugo Hubertus Mettivier Meyer, Dobbs Ferry, N. Y., assignor to Philips Laboratories, Inc., Irvington-on-Hudson, N. Y.

Application November 25, 1947, Serial No. 787,987

2 Claims. (Cl. 48—107)

This invention pertains to evaporators and more particularly, to fuel evaporators for use with combustion apparatus of various types, wherein a combustible fuel-air mixture is required.

An object of this invention is to provide a fuel evaporator having rapid and complete fuel evaporation qualities.

Another object of this invention is to produce a fuel evaporator characterized by being free of fuel residuals such as carbon and gum deposits.

A further object of this invention is to provide a fuel evaporator which is simple in structure, and can be produced and maintained at low cost.

A further object of the invention is to provide a fuel evaporator having a large fuel-air capacity and a small size.

These and further objects of the invention will become apparent as the specification progresses.

According to the invention the liquid fuel evaporator comprises a substantially vertical disposed tubular chamber having open ends, a fuel inlet means, a heat source and an air current means. The fuel inlet means is located at the upper end of the tubular chamber, and is arranged to admit a liquid fuel to the chamber in such manner, that the fuel will run down the inner wall of the chamber under the influence of gravity. The heat source is applied to a lower exterior portion of the chamber and establishes a temperature gradient on the inner surface of the chamber, the temperature of the temperature gradient decreasing in the direction of the fuel inlet means to a value which is below the vaporization temperature of liquid fuel used. Generally, the liquid fuel used in the evaporator is composed of constituents, each having a particular evaporation temperature, and by means of the temperature gradient, each constituent flows downward in the chamber until it reaches its evaporation temperature. In this manner, there is no danger of suddenly exposing the liquid fuel to a temperature of such intensity that cracking would result and leave carbon or gum deposits which is a usual by-product of the fuel cracking process. The air current means is located at the bottom end of the chamber and is arranged to direct a current of air upwards through the chamber. This produces a mixing of air with the fuel vapor, the resulting fuel-air mixture being conducted thereafter to a burner element wherein it is consumed. Quite obviously, the fuel inlet, the heat source and the air flow must be properly correlated and maintained in good adjustment, if complete and efficient fuel-air mixture is to be obtained.

In a preferred embodiment of the invention, an enclosed chamber which is circular in form is arranged at the lower end of the evaporator and an air intake to the said circular chamber is tangentially positioned to produce a rapid circular air movement in the chamber. By this construction the air entering the tubular chamber of the evaporator is given cyclonic movement which results in a circular movement of the fuel on the inner chamber wall which prevents the fuel from flowing downwardly at too rapid a rate, and results in a rapid and thorough mixing of fuel vapor and air.

In another embodiment of the invention, a wire mesh lining is arranged about the inner surface of the evaporator. This brings about a greater dispersion of the liquid fuel over the evaporating surface, and promotes a more rapid evaporation of the fuel.

In order that the invention may be clearly understood, it will now be described with reference to the accompanying drawing which shows by way of example two embodiments thereof.

Figure 1:
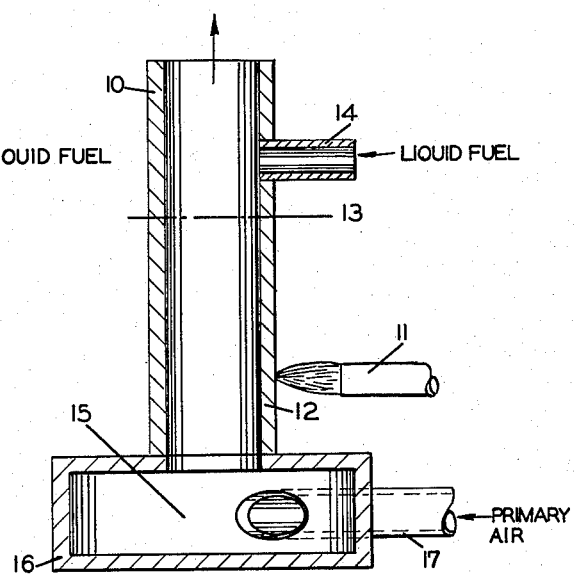
Figure 2:
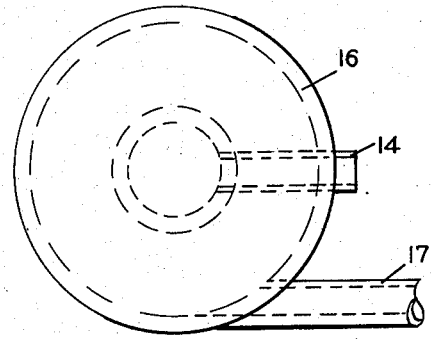

Fig. 1 is a vertical cross-section elevation view of one embodiment of the invention, Fig. 2 is a bottom plan view of the same, and Fig. 3 is a vertical cross-section elevation view of another embodiment of the invention.

Referring to Figs. 1 and 2 the liquid fuel vaporizer there shown comprises a vertically arranged evaporation chamber 10 the lower end 12 of which is provided with a heater 11 which may be of any conventional form and has been shown as a gas flame similar to that produced by a Bunsen burner. By so positioning the heater 11, an inner portion of the chamber 10 is provided with a temperature gradient which decreases in value whereby at approximately the distance as indicated by numeral 13, no significant heating of the remaining portion of the chamber 10 takes place. An inlet pipe 14 arranged at the upper section of the chamber 10, admits liquid fuel to the chamber, the fuel running downwardly on the inner surface of the chamber due to the effect of gravity. As the liquid progresses downwards along the chamber wall and through the region with the temperature gradient, the fuel constituents are differentially evaporated as each constituent encounters its particular evaporation temperature. The lower end of the cylinder 10 opens into an enclosed chamber 15, which has a wall portion 16 concentrically arranged about the axis of the chamber 10. An inlet pipe 17 is arranged to admit primary air to the chamber 15 in a tangential manner as shown causing the air in the chamber to revolve rapidly and upon leaving the chamber, to pass upwardly through the chamber 10 in a turbulent manner. The air passing upwardly in such manner causes the fuel to be rotated upon the chamber wall and rapidly mixes the air and evaporated fuel, the mixture then being conducted from the top of the evaporator to a combustion chamber (not shown).

The fuel evaporator according to the embodiment of the invention shown in Fig. 3 comprises a vertically arranged evaporation chamber 20 having a wire mesh lining 24 secured to and covering the inner surface of the chamber. A heater 22, conforming to that shown in Fig. 1, provides a temperature gradient along the inner portion of the chamber 20, the temperature of which decreases in value up to the region indicated by 23. An inlet pipe 24 positioned above the region 23 admits liquid fuel to the chamber as shown, the fuel running downwardly through the wire mesh on the inner surface of the chamber and being greatly dispersed thereby. As the liquid fuel progresses downwardly into the region of increasing temperature, the fuel constituents are evaporated when each encounters its particular vaporization temperature. Primary air enters the lower open portion of the chamber 20 and is passed through the evaporating chamber in an upward direction, the air rapidly mixing with the evaporated fuel and the mixture then being led from the evaporator to a combustion chamber (not shown).

It will now be apparent that the new and novel fuel evaporator which has been explained above and illustrated in the drawings, has rapid and complete fuel evaporating qualities, will function with little evidence of residuals, such as carbon and gum deposits, and is simple in structure and can be produced and maintained at low cost.

As a specific example of the application of the principles of the invention, I have constructed a satisfactory evaporator having the following dimensions and output. The evaporating chamber is made of one sixteenth inch thick copper tubing having an inside diameter of one half inch and a length of three inches. The primary air chamber has an inside diameter of one and one half inches and is one half inch high. When using commercial gasoline at the rate of approximately .078 gal./hr. and an air flow of approximately 134 cu. ft./hr., I realize a fuel air mixture with an approximate heat potential of 9000 B. t. u.'s/hr.

While I have shown and described particular embodiments of my invention, it is apparent that variations may be made in form without departing from the true spirit of the invention.

What I claim is:

1. A fuel oil vaporizer comprising a first unobstructed chamber of tubular form and having openings at each end, one of said ends being positioned higher than the other, a heating means positioned outside said chamber for directing heat against the side thereof so as to establish by conduction a temperature gradient on a portion of the interior surface of said first chamber which is at the lower of said ends, a duct means entering said first chamber at a region above said temperature gradient, said duct means being arranged to deliver a liquid fuel to said first chamber in such manner that the liquid fuel will flow down the unobstructed interior surface of said first chamber, said temperature gradient decreasing in value in the direction toward said duct means, a second chamber arranged in open communication with said first chamber by the opening in the lower end of said tubular form, said second chamber having a curved wall portion disposed about the common axis of said chambers, and an inlet means opening into said second chamber through said curved wall portion and directed substantially tangentially thereof whereby a gaseous medium being forced into said second chamber will rotate therein and be caused to flow in a turbulent manner through said first chamber in the direction towards said duct means and escape through the upper open end of said first chamber after mixing with vaporized fuel oil therein.

2. A fuel oil vaporizer comprising a first chamber including a cylindrical member vertically disposed and having openings at each end, heating means positioned so as to establish a temperature gradient on a portion of the interior surface of said chamber, a duct means entering said chamber at a region above said temperature gradient, said duct means being arranged to deliver a liquid fuel to said first chamber in such manner that the liquid fuel will flow down the interior surface of said first chamber, said temperature gradient decreasing in value in the direction toward said duct means, a second chamber comprising a pair of disc members spaced apart and connected at the peripheries thereof by a continuous curved wall, one of said discs having an opening in communication with said first chamber at the lower end thereof, and a conduit member tangentially disposed with respect to said curved wall of said second chamber, whereby air which is forced into said second chamber by said conduit member will assume a rotary movement within said second chamber and be caused to flow in a turbulent manner upwardly through said first chamber and escape therefrom through the top opening of said first chamber.

HUGO HUBERTUS METTIVIER MEYER.

REFERENCES CITED

The following references are of record in the file of this patent:

UNITED STATES PATENTS

| Number | Name | Date |
| --- | --- | --- |
| 606,998 | McGowan | July 5, 1898 |
| 615,847 | Hansen | Dec. 13, 1898 |
| 1,018,851 | Thompson | Feb. 27, 1912 |
| 1,490,920 | Godward | Apr. 22, 1924 |
| 1,656,657 | Ashman | Jan. 17, 1928 |
| 1,805,472 | Grivin | May 19, 1931 |
| 1,967,133 | Schreurs | July 17, 1934 |